Patented Sept. 16, 1947

2,427,503

UNITED STATES PATENT OFFICE 2,427,503

PRODUCING ALDEHYDE-PROLAMINE REACTION PRODUCTS

Willard L. Morgan, Columbus, Ohio, assignor, by direct and mesne assignments, to American Maize-Products Company, a corporation of Maine No Drawing. Application July 22, 1944, Serial No. 546,226

13 Claims. (Cl. 260—123)

1

This invention relates to prolamine and similar compositions and to methods for producing the same. More specifically, this invention relates to the aldehyde curing of prolamine and similar compositions, and to agents for controlling the curing.

It is well known that prolamines, for example zein, hordein, gliadin, and the like, react with aldehyde such as, for example, formaldehyde, glyoxal, and acetaldehyde, to form new compositions generally useful as plastics. Depending upon whether or not various materials such as plasticizers and fillers are incorporated, and upon conditions of operation, there may be produced a diversity of compositions of widely varying properties and of potentially widespread commercial utility. For example, many types of prolamine aldehyde plastics may be molded by conventional hot molding processes to produce `rmed articles, such as buttons, buckles, cigatte boxes, door knobs, and the like. In other pplications, processing of prolamine aldehyde compositions has been modified to enable production of compositions suitable for impregnating, for coatings, and for the manufacture of filaments and thin, strong, transparent films or sheets suitable for wrapping and packaging various articles, such as foodstuffs. In still other instances, suitable operational and compounding modifications have been found, to enable the production of both soft and hard rubbery zein plastics, potentially of diverse utility for the manufacture of rubber-like gaskets, stoppers, jar rings, and the like.

For whatever purpose an aldehyde-cured prolamine composition is designed, however, the process of this invention is applicable to the stage or stages of the process of manufacture involving aldehyde curing of the prolamine.

From the foregoing discussion, it will be realized that considerable economic interest attaches to the effective large scale production and utilization of the various types of prolamine compositions. However, this field has not been expanded and exploited to the extent which would be anticipated, in large measure due to the inadequacies of prior production methods, and the serious operational limitations imposed thereby.

It is an object of this invention to overcome what has constituted the most dominant of these operational inadequacies, by providing agents for the control of the aldehyde-curing of prolamine compositions.

At normal temperatures, such as 20° C., the rate of reaction between prolamine and aldehyde, unlike the action of aldehyde with other proteins carrying free amino groups, is slow, requiring approximately six months or more; and it is of a different nature than occurs at higher temperatures. This rate of reaction increases, however, with increasing temperature, and at elevated temperatures in the general range of, say, from 60° C. to 100° C., reaction between prolamine and aldehyde proceeds fairly rapidly. Since plastic mixing or milling operations in the production of prolamine compositions are preferably conducted in the general range of from 70° C. to 90° C., attempts at these temperatures to incorporate the aldehyde in any considerable concentration prior to or during such mixing operations result in a rapid curing of the prolamine composition. In many instances, aldehyde-curing of the prolamine goes forward with such rapidity under these mixing conditions that a state of final cure may be attained and the resulting mass which is then not thermoplastic or moldable is spoiled. Consequently plastic milling time in the forming of prolamine aldehyde compositions or plastics, has had to be kept to a minimum, thereby often rendering practically impossible entirely satisfactory plasticization of the composition and the securing of desired properties, such as maximum tensile strength in the final products. For the foregoing reasons, it has been particularly difficult in the commercial production of pigmented aldehyde-cured prolamine compositions, to effect dispersion of pigments and fillers due to the heat generated in such operation and to the extended periods of time necessary.

It is an object of this invention to provide agents for controlling the aldehyde cure of prolamine compositions while permitting greatly increased periods of mixing time without premature curing as a result.

Molding and curing are generally carried out at higher temperatures such as 120° C. to 150° C. but even so, the curing rates are not as fast as desirable and scorching of the protein often occurs in such curing. Attempts to shorten the time of cure of aldehyde-cured prolamine compositions have resulted in several expedients, none of which has been completely successful since these also increase the curing rate during the mixing period. For example, it has been proposed to conduct the aldehyde curing of zein compositions in the presence of an acid as accelerator, or of an acid promoted by a secondary accelerator of ammonia or of primary amines, as accelerator.

It is an object of this invention to provide agents for controlling the aldehyde-curing of prolamine compositions in a simple, direct manner without incurring the technical and operational difficulties to be anticipated in the use of accelerators such as described by the prior art.

A means which has been proposed to reduce the aldehyde curing of prolamine compositions during compounding operations is the use of urea which combines with and remains in combination with the aldehyde at normal and compounding temperatures, but which liberates some free aldehyde in the range of curing temperatures. The utilization of urea to reduce the aldehyde curing of prolamine compositions prior to curing operations is, however, characterized by undesirable consequences which render it impractical for the production of many prolamine compositions. For example, urea is capable of reacting with formaldehyde to form resinous products. When urea is employed as an aldehyde carrier in the production of prolamine compositions, this reaction can and does proceed irreversibly between urea and aldehyde to form resinous products characteristic of urea-formaldehyde resin type linkages. Such products are brittle, hard resins, and their presence consequently modifies the properties of the prolamine composition produced. In many instances, this renders production of prolamine compositions of predetermined properties quite unlikely, and in many instances effectively precludes any possibility of producing prolamine compositions characterized by special properties conferring potentially diverse and economically attractive utility. For example, I have found in the production of soft rubber-like zein plastics, offering attractive potentialities as rubber substitutes, that the use of urea to retard aldehyde-cure of zein compositions at temperatures below curing temperatures invariably results in the formation of resinous products having characteristics which indicate formation of urea-formaldehyde resin type linkages. In the cured product, such resins impart qualities such as, for example, increasing brittleness and decreasing ability to withstand flexing, particularly upon aging, which render the otherwise desirable product totally unfit for commercial application in the important and economically attractive field of rubber substitutes. Also as little of the formaldehyde is given up by the urea-formaldehyde product to the protein, the actual development of cure is interfered with and is of uncertain degree.

It is an object of the present invention to provide agents for controlling the aldehyde-curing of prolamine compositions with out the attendant formation of undesired resinous products as, for example, the formation of brittle resins characteristic of the urea-formaldehyde resin type linkages, said object permitting, in consequence, the production of either soft or of hard rubberlike prolamine compositions, having utility as rubber substitutes for gaskets, stoppers, jar rings, tires, and the like.

It is also an object of this invention to provide agents for increasing compounding time in the production of aldehyde-cured prolamine compositions, when this is desired, in order to permit smoother and more thorough incorporation of ingredients into the composition, prior to curing operations, thus bringing about a more nearly homogenous composition with resultant improvement in cured-product qualities, while also providing for controlling the aldehyde-cure of prolamine compositions.

It is a further object of this invention to provide a more or less universal process for controlling the aldehyde-cure of prolamine compositions so that the said process may be suitable for this purpose whatever the type of aldehyde-cured prolamine composition it is desired to produce.

Other and ancillary objects and advantages of this invention will be apparent from the detailed description, examples and explanations hereinafter set forth.

I have made the unexpected and surprising discovery that unsymmetrical substituted carbamides of the type:

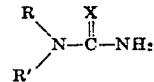

wherein R represents a hydrogen atom or organic radical and R' represents an organic radical, may be effectively employed to control the rate of aldehyde-cure of prolamine compositions. In this formula X stands for oxygen, sulfur, or the imido group (=NH), respectively, according as the unsymmetrical carbamide is a urea, thiourea, or guanidine derivative. Carbamides of this type have been found to possess the ability to enter into chemical reaction with aldehydes to form compounds. This reaction between an aldehyde and such mono-, and di-substituted carbamides to form the mono-, and di-aldehyde derivatives may be represented, in the case of formaldehyde, by the following equations:

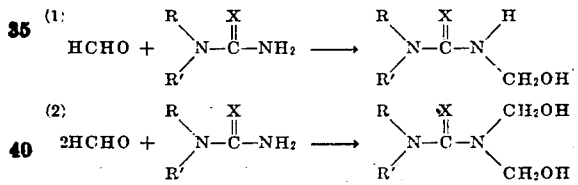

wherein R represents a hydrogen atom or organic radical, the R' represents an organic radical, and X stands for oxygen, sulfur or an imido group (=NH). The products of reaction between aldehyde and the unsymmetrical mono-, and di-substituted carbamides, being characterized by the presence of methylol or substituted methylol groups, are hereinafter identified as mono-, and di-alkylols of unsymmetrical carbamides. It will be apparent from inspection of the equations shown above that depending upon whether one or two moles of aldehyde are reacted with each mole of mono-, or di-substituted carbamide there will be formed, respectively, the corresponding mono, or di-alkylols of the unsymmetrical carbamide employed.

I have also found that this reaction between aldehydes and mono- or di-substituted carbamides is reversible. That is to say, under suitable conditions of temperature, either or both of the mono- and di-alkylols of a substituted carbamide formed, will react to revert to the aldehyde and the substituted carbamide. I have discovered that by proper choice of conditions this phenomenon may be effectively utilized to provide a method for controlling the aldehyde-cure of prolamine compositions. Thus, for example, if an unsymmetrical mono-, or di-substituted urea or carbamide, be reacted in the presence of a prolamine, with aldehyde, whether formaldehyde (as, say trioxymethylene), glyoxal, or acetaldehyde, some or all of such substituted urea or carbamide undergoes reaction by combining with one or two moles of aldehyde per mole of carbamide to form the respective hydroxy compounds which, in the case of formaldehyde, are mono-, and/or di-methylol compounds, according to reactions (1) or (2) or both. While combining with the aldehyde and consequently precluding reaction between the prolamine and the aldehyde, the unsymmetrically substituted urea or carbamide serves in this instance as a retarder of aldehyde-cure of the prolamine composition. Since these alkylol compounds are relatively stable, i. e., do not react to form a urea, thiourea, or guanidine and liberate aldehyde, at temperatures below about 100° C., plastic compounding or milling operations may therefore be thoroughly performed on the cure-retarded batch at temperatures below about 100° C. without danger of premature aldehyde-curing of the prolamine composition.

I have further discovered that unsymmetrically mono-, and di-substituted ureas and their mono, and di-aldehyde derivatives of the type exemplified, described and discussed above, are not capable of forming resinous products with aldehydes, such as linkages of the urea-formaldehyde resin type, since, due to the unsymmetrical substitution of one of the urea nitrogens it is not possible for the aldehyde to form chain-like structures with these as readily occurs with urea. Compounding operations may, therefore, be conducted over relatively extended periods of time without the possibility of urea-aldehyde type resin formation with the attendant deleterious effects on the cured products already discussed. The advantages of extended compounding times, hereinabove set forth, are to permit more thorough incorporation of ingredients, resulting in a more homogeneous composition, and to permit compounding at higher temperatures than heretofore possible for longer periods of time.

While the use of unsymmetrical mono-, or di-substituted carbamides of the type set forth have been found to give the attractive results described, attempts to employ substituted ureas, thioureas, or guanidines carrying substituents on both nitrogens have been unsuccessful, and such carbamide derivatives show none of the desired cure-retarding effects at the mixing temperatures. Thus, not only is the substituted character of one of the said carbamide nitrogens necessary, but for successful use in the prolamine aldehyde plastic composition field the other nitrogen in the carbamide compound must be an unsubstituted amino group, (NH₂), that is, the carbamides must definitely be of an unsymmetrical nature. Thus, symmetrical NN'-diphenyl guanidine and symmetrical NN'-diethanol urea are without utility, possibly because their aldehyde compounds, if any, are weaker than the tendency of the aldehydes to react with the prolamines.

After completion of compounding operations, cure of the resultant prolamine composition carrying the carbamide aldehyde compound may be effected merely by raising the temperature of the mass to the temperature at which reversal of the reaction, by which the mono-, and/or di-alkylols were formed, occurs to reform the original mono-, and/or di-substituted carbamides, and to liberate aldehyde. Reaction between aldehyde and prolamine may then proceed, to effect curing of the composition in normal fashion.

I have further discovered, as fully set forth and described in my co-filed application Serial No. 546,227, filed July 22, 1944, that control of the aldehyde-cure of prolamine compositions may also be accomplished by adding either or both of the prepared mono- and di-methylol or substituted methylol derivatives of the mono- and di-substituted carbamides discussed herein, to the prolamine compositions, either prior to or at the time curing operations are undertaken.

It is pointed out that reversal of the reaction wherein alkylol compounds are formed by reaction of carbamides and aldehydes, is not necessarily sharp, as if there were a temperature which is critical and precise, between the two directions of the reaction. Rather, there will be found a safe range of temperature for compounding the mixture to minimize curing, and a higher range of temperature wherein liberation of the aldehyde and curing takes place. These ranges may be adjacent to each other or more or less widely separated, due in part to the fact that there may be simultaneously two types of union between the carbamide and the aldehyde as hereinabove described, to form, simultaneously both mono-, and di-aldehyde or alkylol compounds, and, correspondingly, two reversals of reactions. For example, even with equal molecular parts of formaldehyde and of a single unsymmetrical carbamide retarder, some portion of the retarder may react in equimolar ratio with formaldehyde, while another portion may react in the proportions of one mole of retarder for two moles of formaldehyde, leaving excess free retarder present. That is, there may be, dependent upon the mixing temperature, simultaneously formed, both mono-, and di-methylol derivatives of the retarder employed. In the case where the di-methylol derivative reacts at a somewhat higher temperature to liberate retarder and free formaldehyde, before the mono-substituted retarder undergoes reaction, the excess free retarder may share the released formaldehyde with the prolamine.

Exactly what occurs then, at a particular temperature, will depend upon the relative reactivities of the materials involved, including the prolamine, also upon the uniformity or homogeneity of mixture, upon actual concentrations, and upon other factors. Therefore, I wish it to be understood that although the mechanism of the reaction may be positively expressed there is no assurance that critical temperatures or transition points are bound to be encountered. Investigation has established that for any given mixture there is a safe temperature range in which it may be compounded, and when compounded, be held; and a higher range wherein release of aldehyde is effected and unretarded curing occurs either at the normal rate as in acid accelerated compositions or at an accelerated rate which permits of a practical curing operation.

Normally, I have my aldehyde compounds of unsymmetrical carbamides to be readily formed and stable and to prevent cure at relatively low temperatures, such as are suitable for mixing operations and for storing materials, and further, that decomposition giving the free aldehyde occurs readily above these normal mixing and storing temperatures. There is no sharp line of division, and the general range of transition in which aldehyde begins to form may vary according to the particular compound present. Merely as a general statement, it may be considered that 100° C. is illustrative of a temperature at and below which the compounds are readily formed and stable and may be effectively used to retard cure during mixing operations, and that at temperatures considerably above 100° C. the compounds release aldehyde for curing. It will be noted in the examples that curing may be effected below 100° C. in some cases, and that uncured mixtures may be maintained safely in uncured condition for certain periods of time at temperatures over 100° C. Thus, merely as a general statement, it may be said that any retarders give effective practical increase in the mixing and milling time at temperatures below 100° C., and they exert no retarding effect at curing temperatures well above this, for example at 120° C. to 150° C. At the latter temperatures rapid cures are commonly desired, and can be readily effected by the present invention.

In the making of prolamine aldehyde compositions and plastics, wherein acid or acid-forming type plasticizers are employed, such as abietic acid, dibutyl tartrate, monomethyl azelate, lactic acid, ricinoleic acid, and the like, the mono- and di-substituted carbamides of the types herein described act to retard aldehyde-curing of the prolamine composition at temperatures below curing temperatures, but are inactive, i. e., neither significantly retard nor accelerate such curing, at conventional curing temperatures. While adding acids or acid type salts, such as ammonium chloride to a prolamine plastic mass has been found to accelerate prior art curing with aldehydes, at elevated temperatures, it has also accelerated curing at lower mixing and milling temperatures, making such use hazardous. When, however, the unsymmetrical carbamide retarders are first added to a prolamine plastic batch the acid type accelerators may then be milled in without this accelerating and premature curing occurring during the mixing. However, the full accelerating effect of such substances is secured, and is not lost, at the elevated curing temperature conditions.

In the making of prolamine compositions and plastics in the presence of certain other types of plasticizers, particularly neutral plasticizers, the normal retarding effect of the present invention is found under the mixing conditions, and the desired absence of such retarding effect is found at the curing temperature and conditions, when employing an aldehyde, such as glyoxal, which is soluble in the plastic mass.

In plastic prolamine masses employing neutral plasticizers such as diethylene glycol, triethylene glycol, hexaethylene glycol or a fatty amide such as lauryl amide, or the like, formaldehyde supplied as trioxymethylene is substantially insoluble and consequently is rather slow to react with the prolamine even at curing temperatures above 100° C. As the aldehyde compound or compounds formed by reaction with the unsymmetrically substituted carbamide are generally soluble in such plastic masses it is found that not only may trioxymethylene be more uniformly dispersed throughout the mass but that due to its solubility through the formation of the soluble substituted alkylol compounds the aldehyde is made more readily available throughout the mass at the curing temperature with the resultant effects that the actual curing rate at curing temperatures is definitely accelerated and the curing is definitely more homogeneous throughout the mass as contrasted to curing with the insoluble aldehyde material alone. Thus, frequently with neutral plasticizers which give prolamine masses, which cure relatively slowly, I am able to secure an acceleration of cure at the high temperatures which is of importance in completing the cure before thermal decomposition or scorching of the protein occurs.

As hereinabove described, I have discovered that substituted carbamides of the type:

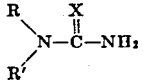

are surprisingly effective as agents for controlling the aldehyde-cure of prolamine compositions. I have stated that in this formula R represents a hydrogen atom or an organic radical, and that R' represents an organic radical, while X represents oxygen, sulfur, or an imido group (=NH). I have discovered that compounds, wherein R and/or R' are of the types listed below, are representative of those compounds conforming structurally with this formula, and are suitable for the processes of this invention. I wish it specifically understood, however, that these are typical of such suitable compounds, but that I do not intend the invention to be limited to these compounds only, or indeed to these types, except as hereinafter set forth in the appended claims:

*Type 1.*—An organic radical present is alkyl.

R=hydrogen; R'=alkyl

Example: Monoethyl urea $(C_2H_5)NH-CO-NH_2$

R=alkyl; R'=alkyl

Example: N,N-diethyl urea $(C_2H_5)_2N-CO-NH_2$

I have discovered that compounds of this type which are most suitable for the processes described herein are those in which the number of carbon atoms in each alkyl group does not exceed 12 carbon atoms.

*Type 2.*—An organic radical present is cyclic.

R=hydrogen; R'=furfuryl

Example: Monofurfuryl urea

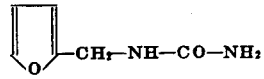

R=alkyl; R'=cycloalkyl

Example: N,N-methyl cyclohexyl urea

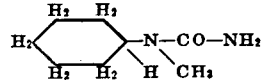

*Type 3.*—An organic radical present is hydroxyalkyl.

R=hydrogen; R'=hydroxyalkyl

Example: Monoethanol urea $HOCH_2-CH_2-NH-CO-NH_2$

R=hydroxyalkyl; R'=hydroxyalkyl

Example: N,N-di-(2-hydroxypropyl) urea $(CH_3-CHOH-CH_2)_2N-CO-NH_2$

*Type 4.*—An organic radical present is aryl.

R=hydrogen; R'=aryl

Example: Monophenyl thiourea

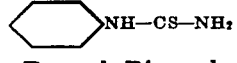

R=aryl; R'=aryl

Example: N,N-diphenyl guanidine

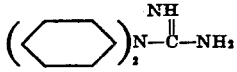

*Type 5.*—An organic radical present is substituted aryl.

R=hydrogen; R'=substituted aryl
Example: Paramethoxy monophenyl urea

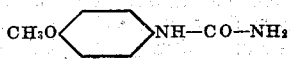

R=substituted aryl; R'=substituted aryl
Example: Di-(orthomethoxy) phenyl urea

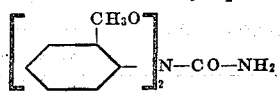

Aryl amino and phenolic substituted unsymmetrical carbamides cannot, however, be employed as cure retarders as these would be doubly reactive with aldehydes and resin-forming.

*Type 6.*—An organic radical present is a secondary or tertiary aminated alkyl.
R=hydrogen;
R'=aminated alkyl carrying secondary or tertiary amino groups
Example: N-mono(hydroxyethyl ethylamine) urea

N-mono (ethylmorpholine) urea

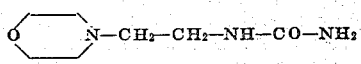

Carbamides carrying alkyl groups containing primary amino groups may not be employed due to this making such carbamides doubly reactive with aldehydes and thus forming undesirable resins.

Further specific examples which have been found useful are mono-butyl urea, mono- lauryl urea, allyl thiourea, N-N-diethanol urea, monoethanol guanidine, N-mono-ethyl-N-mono-ethanol urea, N-mono-phenyl-N-mono-ethanol urea, mono-(2-hydroxypropyl) urea, N-mono-2(butanol 1) urea, N - mono - 2(2 - methyl - 1- propanol) urea, N - mono-2(2-methyl-1-3-propanediol) urea, N-mono-(trihydroxy-methyl methane) urea, N - mono - 2(2 - ethyl - 1-3-propanediol) urea mono-phenyl urea, mono-phenyl guanidine, N - N - phenyl-methyl urea, N - N - phenyl-butyl urea, N - N - diphenyl urea, and mono-benzyl urea. Many of the unsymmetrical carbamides, particularly those carrying hydroxyalkyl organic radicals, are liquids and solvents in themselves for the prolamines and as such they are of considerable aid in speeding up the plastic mixing and insuring uniformity of mix.

As is well-known, the prolamines are a group of proteins characterized by solubility in aqueous alcohol solutions which are found only in certain cereal grains. The well-known prolamines include zein, found in corn, gliadin, found in wheat, hordein, found in barley, secalin from rye, sorghumin from sorghum, and the alcohol-soluble protein extractable from oats. The prolamines constitute a large portion of the protein found in the starchy or endosperm parts of the cereal grains and they are isolated from such starchy portions after the grains have been de-germinated, as for example in cornstarch manufacture by the wet-milling process or in the manufacture of wheat or other flours by the dry-milling process. The starches may be removed by mechanical washing action as in the preparation of wheat gluten, by wet kneading of the floury mixture, or they may be removed as in the commercial separation of cornstarch. The protein concentrates thus secured may then be extracted by aqueous alcohol or otherwise treated to produce more concentrated or purified alcohol-soluble prolamines as is well known in the art for producing zein and gliadin. These various prolamines may be used to manufacture prolamine compositions and plastic products and be cured with formaldehyde, and in each case the described unsymmetrical carbamides may be employed to retard such curing action during mixing or in storage, and to effect control of the curing action. Certain modifications of the prolamines have become available, such as for instance zein acetate, or zein modified by heat and water-vapor or water treatment, and when compositions or plastics are formed of these with aldehydes we have found our retarders to act as effectively with such modified prolamines as with the normal prolamine themselves.

Prolamine plastic compositions may also be formed from the crude protein concentrates derived directly from the de-germinated cereals when these contain a considerable proportion of a prolamine. Thus, as a suitable corn protein for forming plastics we may use the corn gluten resulting from the commercial separation of cornstarch in the wet-milling process which may contain from 40% to 65% of corn proteins primarily of prolamine nature, a large part being the alcohol-soluble prolamine and the remainder of the protein being the alcohol insoluble modified prolamine modified by heat and water treatment. The non-protein remainder of the gluten consists primarily of starch with small quantities of cellulosic bodies and fatty substances. Partially purified corn glutens such as those produced in Shildneck patent, U. S. No. 2,274,004, by further removal of starch with acids or as shown in Schopmeyer patent, U. S. No. 2,310,104, wherein fatty materials are removed and which contain 60% to 100% protein content, can obviously be used in making cured corn protein compositions and plastics with aldehydes. In making prolamine compositions with these various impure prolamine mixtures and from similar prolamine-containing mixtures made from other cereal grains, the unsymmetrical ureas have been found to operate as aldehyde-cure-controlling reagents and retarders during the mixing stages. It will be understood that as I have used the word "aldehyde-reactive prolamine-base protein" in the description here given and in the appended claims, I include by such terms not alone the prolamines from the various cereal grains but also include mixtures of cereal proteins produced from the endosperm which contain a considerable proportion of prolamine, and also include by such term proteins which are modified or chemically altered prolamines capable of reacting and cure with aldehydes.

Utilization of mono- and di-substituted carbamides as agents for controlling the aldehyde-cure of prolamine compositions is illustrated in the following examples, which, however, I intend as typical and informative only, and as in no way to impose limitations upon the invention, since it is intended to cover all equivalents and all modifications within the scope of the claims hereinafter set forth. Mono-substituted carbamides of the type:

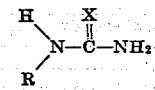

may be prepared by the heating of primary amines with suitable carbamides. Di-substituted ureas of the type

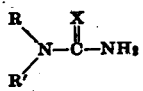

may be prepared by the similar reaction of secondary amines with suitable carbamides. The preparation of these compounds forms no part of the present invention, these methods being well known.

*Example 1.—Acid type plasticizer*

Two plastic mixes, A and B, as follows were prepared by milling upon rubber rolls zein and dibutyl tartrate until a uniform plastic mass was secured. The unsymmetrical diethanol urea was then milled into batch B.

| Recipe (parts by weight) | Sample | |
|---|---|---|
| | A | B |
| Zein | 100 | 100 |
| Dibutyl tartrate | 100 | 100 |
| Trioxymethylene | 1.5 | 1.5 |
| Unsymmetrical diethanol urea | None | 5 |

To portions of the batches placed upon rolls at the following temperatures the appropriate amounts of trioxymethylene were added. The time required for complete curing of the resultant compositions on the rolls after adding the aldehyde is shown in the following table, at which time the masses were no longer thermoplastic, crumbled off the rolls, and would not adhere to themselves, this being time for the cure of prolamine product.

| Temperature (° C.) | Time (Minutes) | |
|---|---|---|
| | Sample A | Sample B |
| 70 | 180 | 235 |
| 90 | 105 | 125 |
| 130 | 35 | 35 |
| 140 | 20 | 20 |
| 150 | 7.5 | 7.5 |

It is evident that within the temperature range 70° to 90° C. while on the rolls (conventional mixing range of temperatures) the unsymmetrical diethanol urea served effectively to retard curing of the composition, but within the temperature range 130° to 150° C. (conventional article-molding and curing range of temperatures) the aldehyde cure of the composition was neither accelerated nor retarded. Plastic pieces sheeted out on the rolls at temperatures below 100° C. were pressed into strips within a mold in a hydraulic press at 135° C. for 30 minutes, giving flexible rubbery cured products which were alike whether made from batch A or B.

*Example 2.—Acid type plasticizer*

| Recipe (parts by weight) [1] | Sample | | |
|---|---|---|---|
| | A | B | C |
| Zein | 100 | 100 | 100 |
| Methyl Half Ester of Azelaic Acid | 100 | 100 | 100 |
| Trioxymethylene | 1.5 | 1.5 | 1.5 |
| Unsymmetrical Mono-Ethanol Urea | None | 5 | None |
| Urea | 5 | None | None |

[1] In this case three plastic mixes were made up by the use of an internal mixer of the Werner and Pfleiderer type. Urea is not compatible in the prolamine plastics. All but the aldehyde was first introduced and worked into a plastic mass.

After adding the aldehyde the times required for complete curing of the resultant compositions were determined and are shown in the following table. These times were determined either by continuous milling on a roll as in Example 1 or by continuous mixing in the Werner and Pfleiderer at the temperatures shown.

| Temperature (° C.) | Time (Minutes) | | |
|---|---|---|---|
| | Sample A | Sample B | Sample C |
| 70 | 510+ | 240 | 180 |
| 90 | 510 | 120 | 105 |
| 130 | 90 | 30 | 35 |

It is evident that both the urea and the unsymmetrical mono-ethanol urea retarded curing at mixing temperature and further that the urea interferred with securing cure at curing temperature. It was found upon further evaluation after pressing samples of the thermoplastic uncured masses in molds at 130° C. for the minimum times shown, that in the case of sample A of this example, the cured product contained brittle urea-formaldehyde type resins, as the strips were stiff, which upon aging of the plastic resulted in undesirable properties of the composition evidenced by progressive hardening and increasing brittleness leading to rapid loss of all flexibility, and cracking. The plastic articles made following formula B or C, however, were flexible, rubber like, and retained their flexibility and were useful as replacements for rubber gaskets and rubber stoppers. Plastic pieces of batch A whether cured at 130° C. for 35 or 90 minutes still yielded soluble unreacted prolamine when extracted with 70% alcohol, as contrasted with the complete alcohol insolubility developed in batches B and C in 35 minutes at this temperature, which were thus completely cured.

*Example 3.—Neutral plasticizer*

Plastic mixes were made as follows:

| Recipe (parts by weight) | A | B |
|---|---|---|
| Zein | 100 | 100 |
| Diethylene Glycol | 100 | 100 |
| Trioxymethylene | 1.5 | 1.5 |
| Unsymmetrical Diethanol Urea | None | 5 |

After milling together all of the ingredients except the aldehyde to secure a plastic mass the aldehyde was added and the time from such addition determined before curing became evident on the rolls operating at various temperatures by a loss of thermoplasticity and a loss of solubility in 70% alcohol of small samples of the batch.

Time required for complete curing of the resultant compositions at various temperatures is shown in the following table:

| Temperature (° C.) | Time (Minutes) | |
|---|---|---|
| | A | B |
| 70 | 900 | 430 |
| 90 | 250 | 160 |
| 115 | 90 | 85 |
| 130 | 60 | 50 |
| 140 | 40 | 30 |
| 150 | 25 | 12 |

In this instant, the trioxymethylene was insoluble in the mix at room and elevated temperatures. At curing temperatures, beginning with 115° C. in the case of sample A, the trioxymethylene decomposed liberating gaseous formaldehyde which then reacted with the zein. The addition of unsymmetrical diethanol urea as in the mix B resulted in reaction of unsymmetrical diethanol urea with trioxymethylene to form liquid methylol compounds which were soluble in and miscible with the plastic mix.

It is evident that the unsymmetrical diethanol urea by such properties served to accelerate curing of the mix both at mixing and curing temperatures. The accelerated curing time noted at mixing temperatures is insufficient to necessitate undesirably short mixing operations. The acceleration of cure effected at curing temperatures is, however, of extreme importance, since charring and other evidence of heat decomposition is quite evident in this instance after 70 minutes at 130° C., 45 minutes at 140° C., and after 30 minutes at 150° C. The operative molding advantage of short curing time at high temperatures, when using neutral plasticizers, permitted by this invention is, therefore, of the utmost practical importance. When plastic pieces prepared by milling together the various ingredients in batches A and B for 90 minutes on rolls at 90° C. were cured in a mold at 130° C. for 60 minutes, soft, slightly tacky, highly rubbery transparent sheets were secured of a permanent rubbery nature. Sheet B, however, was of a higher transparency and tensile strength. Each cured upon cloth as a coating gave a permanently tacky adhesive cloth useful for protecting articles from which it could readily be stripped.

*Example 4*

| Recipe (parts by weight) | A | B | C | D |
|---|---|---|---|---|
| Zein | 100 | 100 | 100 | 100 |
| Dibutyl Tartrate | 100 | 100 | None | None |
| Diethylene Glycol | None | None | 100 | 100 |
| Glyoxal | 1.5 | 1.5 | 1.5 | 1.5 |
| Monoethanol urea | None | 5 | None | 5 |

As in the previous examples the mixes were made and the times required for complete curing of the resultant compositions determined with results as shown in the following table:

| Temperature (° C.) | Time (Minutes) | | | |
|---|---|---|---|---|
| | A | B | C | D |
| 90 | 90 | 1,440 | 240 | 1,440 |
| 130 | 20 | 50 | 30 | 35 |

In making plastic mixes with glyoxal the high degree of retardation secured at mixing temperatures when employing an unsymmetrical carbamide as a retarder enables one to supply the glyoxal as a 30% aqueous solution and to remove the water by evaporation during the mixing by operating either on a roll or in an internal mixer at 100° C. The glyoxal reaction compounds with unsymmetrical mono or di-ethanol urea for instance can readily be formed at 100° C. and the water directly distilled off if aqueous glyoxal is employed. On the other hand, at 120° C. the compounds begin to decompose rapidly to give free aldehyde and as shown above there is little effect upon the curing rate in the desired plastic molding and curing range. The products secured by curing strips of the thermoplastic mixes in molds at 130° C. for the times shown were reddish, semi-transparent plastics, very rubbery in nature.

*Example 5*

A rubber-like plastic suitable for use as a shoe sole was made by mixing in an internal mixer the following ingredients, as follows:

| | Parts by weight |
|---|---|
| Zein | 31.9 |
| Mono-methyl azelate | 36.4 |
| Trioxymethylene | 1.5 |
| Unsymmetrical diethanol urea | 3.0 |
| Clay | 22.2 |
| Carbon black | 5.0 |

In the absence of the retarder it was found almost impossible to incorporate the pigments, particularly the carbon black, without premature curing occurring during the mixing operation since the grinding of the pigments into the plastic mass increases the viscosity of the mass greatly and through the mechanical working raises the temperature considerably. On the other hand, in the presence of the retarder uniformly mixed batches were easily secured and due to the uniformity in the mixture the final cured products were of higher tensile strength. After carrying out thorough mixing in either an internal mixer, or preferably upon milling rolls for rubber, the soft thermoplastic uncured mass was sheeted out on such a roll and portions of such sheet were then placed within an ordinary shoe-sole mold such as is used in the rubber trade. Curing was then carried out by heating such mold to 130° C. for one-half hour under a hydraulic pressure of 100–500 lbs. per square inch. Such pressures have been found suitable in the manufacture of plastics from prolamines. The product showed a tensile strength of 1200 lbs. per square inch, elongation of 145% and a Shore durometer hardness as employed in the rubber trade of 85.

*Example 6*

As a further example wherein I employ a crude mixture of cereal proteins containing prolamines, hard prolamine plastic articles such as door knobs of a black color were made by molding, under similar conditions to those used in Example 5, masses of the following plastic mixture:

| | Parts by weight |
|---|---|
| Corn gluten, 60% protein content | 40 |
| Nevillac 10° (coumarone-indene-phenol resin, Neville Company, Pittsburgh, Pa.) | 35 |
| Triethylene glycol | 5 |
| Asbestine | 8 |
| Channel black | 5 |
| Trioxymethylene | 2 |
| Mono-phenyl thiourea | 5 |

In making the plastic mixture prior to the curing, the plasticizers and gluten were first mixed in a plastic masticating machine along with the retarder, mono-phenyl thiourea. The aldehyde and pigments were then incorporated and the mass worked at below 90° C. until it was thoroughly uniform. The retarder perfectly inhibited any premature curing difficulties during the mixing operations but did not retard the actual curing when the mass was placed in the molds and cured at temperatures above 120° C.

While I have illustrated the invention with respect to the use of formaldehyde in its solid polymer form, known as trioxy-methylene, it is apparent that the use of this particular form of formaldehyde has been one merely of convenience and that my retarders will work equally as well with aqueous formaldehyde where it is desired to add this in the forming of my plastic masses. In a similar way, I may utilize acetaldehyde in the presence of the unsymmetrical carbamide retarders although here the advantages secured are of much less commercial importance due to the slower rate of reaction of acetaldehyde with prolamines in both the mixing and curing-temperature ranges. The unsymmetrical carbamides, however, do retard the rate of reaction of acetaldehyde with prolamines at temperatures below 100° C. This is in line with the stability of compounds of acetaldehyde with such carbamides, for example, the unsymmetrical ethanol ureas which may readily be formed at temperatures below 100° C. At about 120° C. the acetaldehyde ethanol urea compounds rapidly decompose to give free aldehyde which is then available to cure the protein.

The reaction of aldehydes with prolamines at the curing temperatures results in the plastic masses becoming insoluble in aqueous alcohols and much more resistant to the absorption of water as compared with masses containing the uncured prolamine. Also by such curing reaction the aldehyde-prolamine compounds produced become relatively non-thermoplastic so that the mass permanently takes on the shape of the mold in which the curing is carried out. This loss of thermoplasticity has been the source of difficulty experienced when premature curing occurs during the mixing or plastic forming operations. Thus, while these operations are carried on below 100° C. when the masses are prepared on commercial milling rolls of the type used for rubber, or in internal mixers, or by other means of plastic working, it is found that when the mass prematurely cures during such operations the plastic mass suddenly becomes nonplastic and converts into a non-coherent mass of crumbly nature, from which it is impossible to form molded articles, since the material is not thermoplastic.

The use of the aldehyde-controlling unsymmetrical carbamides in the forming of the plastic masses prevents such premature curing and batch losses, as expressed in the appended claims.

I claim:

1. The process of curing aldehyde-reactive prolamine-base protein which comprises compounding to substantial homogeneity a non-liquid mass comprising essentially and primarily said protein and curing aldehyde at a mixing temperature below a curing temperature in the vicinity of 120° C. to form a curable mix or compound, and including in the mix unsymmetrical substituted carbamide of the formula RR'N—CX—NH₂ wherein R represents a member of the group consisting of hydrogen and organic radicals inert to said aldehyde, R' represents an organic radical inert to said aldehyde, and X represents a member of the group consisting of =O, =S, and =NH; and heating the resulting compound to a curing temperature upwardly from 120° C., whereby in the compounding the carbamide selectively reacts with said aldehyde and in the heating the resulting reaction product of the aldehyde and carbamide releases aldehyde for selective reaction with said protein to cure the same.

2. The process of curing aldehyde-reactive prolamine-base protein which comprises compounding to substantial homogeneity a non-liquid mass comprising essentially and primarily said protein and a form of formaldehyde at a mixing temperature below a curing temperature in the vicinity of 120° C. to form a curable mix or compound, and including in the mix unsymmetrical substituted carbamide of the formula

RR'N—CX—NH₂ wherein R represents a member of the group consisting of hydrogen and organic radicals inert to said aldehyde, R' represents an organic radical inert to said aldehyde, and X represents a member of the group consisting of =O, =S, and =NH; and heating the resulting compound to a curing temperature upwardly from 120° C., whereby in the compounding the carbamide selectively reacts with said aldehyde and in the heating the resulting reaction product of the aldehyde and carbamide releases aldehyde for selective reaction with said protein to cure the same.

3. The process of curing prolamine which comprises compounding to substantial homogeneity a non-liquid mass comprising essentially and primarily said prolamine and curing aldehyde at a temperature below a curing temperature in the vicinity of 120° C. to form a curable mix or compound, and including in the mix unsymmetrical substituted carbamide of the formula

RR'N—CX—NH₂ wherein R represents a member of the group consisting of hydrogen and organic radicals inert to said aldehyde, R' represents an organic radical inert to said aldehyde, and X represents a member of the group consisting of =O, =S, and =NH; and heating the resulting compound to a curing temperature upwardly from 120° C., whereby in the compounding the carbamide selectively reacts with the aldehyde and in the heating the resulting reaction product of the aldehyde and carbamide releases aldehyde for selective reaction with said prolamine to cure the same.

4. The process of curing prolamine which comprises compounding to substantial homogeneity a non-liquid mass comprising essentially and primarily said prolamine and a form of formaldehyde at a mixing temperature below a curing temperature in the vicinity of 120° C. to form a curable mix or compound, and including in the mix unsymmetrical substituted carbamide of the formula RR'N—CX—NH₂ wherein R represents a member of the group consisting of hydrogen and organic radicals inert to said aldehyde, R' represents an organic radical inert to said aldehyde, and X represents a member of the group consisting of =O, =S, and =NH; and heating the resulting compound to a curing temperature upwardly from 120° C., whereby in the compounding the carbamide selectively reacts with said aldehyde and in the heating the resulting reaction product of the aldehyde and carbamide releases aldehyde for selective reaction with said prolamine to cure the same.

5. The process of curing aldehyde-reactive prolamine which comprises compounding to substantial homogeneity a non-liquid mass comprising essentially and primarily said protein, plasticizer for the cured protein, and curing aldehyde at a temperature below a curing temperature in the vicinity of 120° C. to form a curable mix or compound, and including in the mix unsymmetrical substituted carbamide of the formula

RR'N—CX—NH₂ wherein R represents a member of the group consisting of hydrogen and organic radicals inert to said aldehyde, R' represents an organic radical inert to said aldehyde, and X represents a member of the group consisting of =O, =S, and =NH; and heating the resulting compound to a curing temperature upwardly from 120° C., whereby in the compounding the carbamide selectively reacts with aldehyde and in the heating the resulting reaction product of the aldehyde and carbamide releases aldehyde for selective reaction with said protein to cure the same.

6. The process of curing aldehyde-reactive prolamine-base protein which comprises compounding to substantial homogeneity a non-liquid mass comprising essentially and primarily said protein, plasticizer for the cured protein, and curing aldehyde at a mixing temperature below a curing temperature in the vicinity of 120° C. to form a curable mix or compound, and including in the mix unsymmetrical substituted carbamide of the formula RR'N—CX—NH₂ wherein R represents a member of the group consisting of hydrogen and organic radicals inert to said aldehyde, R' represents an organic radical inert to said aldehyde, and X represents a member of the group consisting of =O, =S, and =NH; and heating the resulting compound to a curing temperature upwardly from 120° C., whereby in the compounding the carbamide selectively reacts with said aldehyde and in the heating the resulting reaction product of the aldehyde and carbamide releases aldehyde for selective reaction with said protein to cure the same.

7. The process of curing aldehyde-reactive prolamine-base protein which comprises compounding to substantial homogeneity a non-liquid mass comprising essentially and primarily said protein, plasticizer for the cured protein, and a form of formaldehyde at a mixing temperature below a curing temperature in the vicinity of 120° C. to form a curable mix or compound, and including in the mix unsymmetrical substituted carbamide of the formula

RR'N—CX—NH₂ wherein R represents a member of the group consisting of hydrogen and organic radicals inert to said aldehyde, R' represents an organic radical inert to said aldehyde, and X represents a member of the group consisting of =O, =S, and =NH; and heating the resulting compound to a curing temperature upwardly from 120° C., whereby in the compounding the carbamide selectively reacts with said aldehyde and in the heating the resulting reaction product of the aldehyde and carbamide releases aldehyde for selective reaction with said protein to cure the same.

8. The process of curing prolamine which comprises compounding to substantial homogeneity a non-liquid mass comprising essentially and primarily said prolamine, plasticizer for the cured prolamine, and a form of formaldehyde at a mixing temperature below a curing temperature in the vicinity of 120° C. to form a curable mix or compound, and including in the mix unsymmetrical substituted carbamide of the formula RR'N—CX—NH₂ wherein R represents a member of the group consisting of hydrogen and organic radicals inert to said aldehyde, R' represents an organic radical inert to said aldehyde, and X represents a member of the group consisting of =O, =S, and =NH; and heating the resulting compound to a curing temperature upwardly from 120° C., whereby in the compounding the carbamide selectively reacts with said aldehyde and in the heating the resulting reaction product of the aldehyde and carbamide releases aldehyde for selective reaction with said prolamine to cure the same.

9. The process of preparing a heat-curable mix of aldehyde-reactive prolamine-base protein which comprises compounding to substantial homogeneity a non-liquid mass comprising essentially and primarily said protein and curing aldehyde, and including in the mix unsymmetrical substituted carbamide of the formula

RR'N—CX—NH₂ wherein R represents a member of the group consisting of hydrogen and organic radicals inert to said aldehyde, R' represents an organic radical inert to said aldehyde, and X represents a member of the group consisting of =O, =S, and =NH, at a temperature at which said carbamide is preferentially and more reactive with aldehyde than is said protein and thereby reacting said aldehyde and said carbamide in the presence of said protein whereby to form a curable mix or compound in which the resulting reaction product releases aldehyde upon the application of heat to cure said protein.

10. The process of curing aldehyde-reactive prolamine-base protein which comprises compounding to substantial homogeneity a non-liquid mass comprising essentially and primarily said protein and curing aldehyde, and including in the mix unsymmetrical substituted carbamide of the formula RR'N—CX—NH₂ wherein R represents a member of the group consisting of hydrogen and organic radicals inert to said aldehyde, R' represents an organic radical inert to said aldehyde, and X represents a member of the group consisting of =O, =S, and =NH, at a temperature at which said carbamide is preferentially and more reactive with aldehyde than is said protein and thereby reacting said aldehyde and said carbamide and forming a reaction product in the presence of said protein whereby to form a curable mix or compound; and heating the resulting compound to a curing temperature at which said reaction product releases aldehyde for selective reaction with said protein to cure the same.

11. The process of curing prolamine which comprises compounding to substantial homogeneity a non-liquid mass comprising essentially and primarily said prolamine and trioxymethylene at a mixing temperature below a curing temperature in the vicinity of 120° C. to form a curable mix or compound, and including in the mix unsymmetrical N—N—diethanol urea, thereby reacting said urea selectively with aldehyde and forming a reaction product which holds the aldehyde against reaction with said prolamine until released at a curing temperature for the mix; and heating the resulting compound to a curing temperature upwardly from 120° C. at which said reaction product releases aldehyde for selective reaction with the prolamine to cure the same.

12. The process of curing aldehyde-reactive prolamine-base protein which comprises compounding to substantial homogeneity a non-liquid mass comprising essentially and primarily said protein and curing aldehyde at a mixing temperature below a curing temperature in the vicinity of 120° C. to form a curable mix or compound, and including in the mix unsymmetrical N—N—diethanol urea, thereby reacting said urea selectively with aldehyde and forming a reaction product which holds the aldehyde against reaction with said protein until released at a curing temperature for the mix; and heating the resulting compound to a curing temperature upwardly from 120° C. at which said reaction product releases aldehyde for selective reaction with the prolamine to cure the same.

13. The process of curing aldehyde-reactive prolamine-base protein which comprises compounding to substantial homogeneity a non-liquid mass comprising essentially and primarily said protein and a form of formaldehyde at a mixing temperature below a curing temperature in the vicinity of 120° C. to form a curable mix or compound, and including in the mix an ethanol urea having an unsubstituted $NH_2$ group, thereby reacting said urea selectively with aldehyde and forming a reaction product which holds the aldehyde against reaction with said protein until released at a curing temperature for the mix; and heating the resulting compound to a curing temperature upwardly from 120° C. at which said reaction product releases aldehyde for selective reaction with the prolamine to cure the same.

WILLARD L. MORGAN.

REFERENCES CITED

The following references are of record in the file of this patent:

UNITED STATES PATENTS

| Number | Name | Date |
| --- | --- | --- |
| 2,143,023 | Meigs | Jan. 10, 1939 |
| 2,315,402 | D'Alelio | Mar. 30, 1943 |
| 2,331,434 | Sitzler | Oct. 12, 1943 |
| 2,331,926 | Olin | Oct. 19, 1943 |

Certificate of Correction

Patent No. 2,427,503.                                                                 September 16, 1947.

WILLARD L. MORGAN

It is hereby certified that errors appear in the printed specification of the above numbered patent requiring correction as follows: Column 6, line 58, after "I have" insert *found*; column 9, line 46, after "panediol) urea" insert a comma; column 12, line 74, for "instant" read *instance*; column 16, line 19, claim 2, for "aldehyde" read *formaldehyde*; and that the said Letters Patent should be read with these corrections therein that the same may conform to the record of the case in the Patent Office.

Signed and sealed this 25th day of November, A. D. 1947.

[SEAL]

THOMAS F. MURPHY,
*Assistant Commissioner of Patents.*